United States Patent
Miyachi

(10) Patent No.: US 7,670,503 B2
(45) Date of Patent: *Mar. 2, 2010

(54) LIQUID CRYSTAL DISPLAY DEVICE AND ELECTRONIC DEVICE HAVING THE SAME

(75) Inventor: Koichi Miyachi, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 265 days.

This patent is subject to a terminal disclaimer.

(21) Appl. No.: 11/718,633

(22) PCT Filed: Nov. 7, 2005

(86) PCT No.: PCT/JP2005/020376

§ 371 (c)(1),
(2), (4) Date: May 4, 2007

(87) PCT Pub. No.: WO2006/051755

PCT Pub. Date: May 18, 2006

(65) Prior Publication Data

US 2008/0100776 A1    May 1, 2008

(30) Foreign Application Priority Data

Nov. 15, 2004 (JP) ............................. 2004-330975

(51) Int. Cl.
- C09K 19/00 (2006.01)
- C09K 19/06 (2006.01)
- C09K 19/52 (2006.01)
- C09K 19/02 (2006.01)
- G02F 1/1335 (2006.01)

(52) U.S. Cl. .................. 252/299.01; 428/1.1; 430/20; 349/61; 349/69; 349/167; 349/182

(58) Field of Classification Search ............ 252/299.01; 428/1.1; 430/20; 349/61, 69, 167, 182
See application file for complete search history.

(56) References Cited

U.S. PATENT DOCUMENTS

| | | | |
|---|---|---|---|
| 6,468,607 B1 | 10/2002 | Takehara et al. | |
| 6,771,334 B2 | 8/2004 | Kubota et al. | |
| 2002/0196220 A1 | 12/2002 | Sato et al. | |
| 2009/0046221 A1* | 2/2009 | Miyachi | ........................ 349/69 |

FOREIGN PATENT DOCUMENTS

| | | |
|---|---|---|
| EP | 1 591 513 A1 | 11/2005 |
| GB | 2 311 643 A | 10/1997 |
| JP | 07-316556 A | 12/1995 |
| JP | 09-258227 A | 10/1997 |
| JP | 10-255699 A | 9/1998 |
| JP | 10-292173 A | 11/1998 |
| JP | 11-237632 A | 8/1999 |
| JP | 2002-038154 A | 2/2002 |
| JP | 2002-069449 A | 3/2002 |
| JP | 2002-107719 A | 4/2002 |
| JP | 2002-308814 A | 10/2002 |
| JP | 2003-156609 A | 5/2003 |
| JP | 2003-215535 A | 7/2003 |
| JP | 2004-094039 A | 3/2004 |

OTHER PUBLICATIONS

Official communication issued in the counterpart International Application No. PCT/JP2005/020376, mailed on May 24, 2007.
Official Communication for PCT Application No. PCT/JP2005/020376; mailed on Dec. 27, 2005.
Ichinose et al., "High Optical Anisotropy and Small Rotational Viscosity LC Mixture for Field-Sequential Color TN-LCDs," IDW'00, pp. 77-80, 2000.

* cited by examiner

*Primary Examiner*—Geraldina Visconti
(74) *Attorney, Agent, or Firm*—Keating & Bennett, LLP

(57) ABSTRACT

A liquid crystal display device includes an illuminator and a liquid crystal panel for performing displaying by using light which is emitted from the illuminator. The liquid crystal panel includes a pair of substrates and a liquid crystal layer provided therebetween. The liquid crystal layer is formed of a liquid crystal material which contains molecules having at least one of a carbon-carbon triple bond and a polycyclic group. The illuminator includes a light source causing primary generation of at least blue light, among other light which is used for displaying.

14 Claims, 9 Drawing Sheets

LED#3

LED#4

(a)

(b)

LIQUID CRYSTAL DISPLAY DEVICE AND ELECTRONIC DEVICE HAVING THE SAME

BACKGROUND OF THE INVENTION

1. Field of the Invention

The present invention relates to a liquid crystal display device, and in particular, to a liquid crystal display device including a liquid crystal layer which is formed of a low-viscosity liquid crystal material. Moreover, the present invention also relates to an electronic apparatus incorporating such a liquid crystal display device.

2. Description of the Related Art

In recent years, the needs for displaying moving picture information on a liquid crystal display device are rapidly increasing. In order to display moving pictures on a liquid crystal display device with a high quality, it is necessary to reduce the response time (i.e., increase the response speed) of the liquid crystal layer, and it is a requirement to reach a predetermined gray scale level within one vertical scanning period (which typically is one frame).

As one technique for improving the response characteristics of a liquid crystal display device, a technique of using a low-viscosity liquid crystal material has been proposed. Low-viscosity liquid crystal materials are disclosed in Japanese Laid-Open Patent Publication No. 10-292173 (Patent Document 1), for example.

However, conventional liquid crystal display devices have a problem in that, when a low-viscosity liquid crystal material is used, the voltage retention rate may be lowered during use, thus resulting in display unevenness. Therefore, liquid crystal display devices using a low-viscosity liquid crystal material lack in reliability, and have not been put to practical use.

SUMMARY OF THE INVENTION

Preferred embodiments of the present invention solve the above-described problems, and improve the reliability of a liquid crystal display device including a liquid crystal layer which is formed of a low-viscosity liquid crystal material.

A liquid crystal display device according to a preferred embodiment of the present invention is a liquid crystal display device including an illuminator and a liquid crystal panel for performing displaying by using light which is emitted from the illuminator, wherein, the liquid crystal panel includes a pair of substrates and a liquid crystal layer provided between the pair of substrates; the liquid crystal layer is formed of a liquid crystal material which includes molecules having at least one of a carbon-carbon triple bond and a polycyclic group; and the illuminator includes a light source causing primary generation of at least blue light, among other light which is used for displaying.

In a preferred embodiment, a coefficient of rotational viscosity $\gamma_1$ of the liquid crystal material at approximately 20° C. is preferably about 120 mPa·s or less.

In a preferred embodiment, the molecules contained in the liquid crystal material have a chemical structure expressed by one of the following formulae:

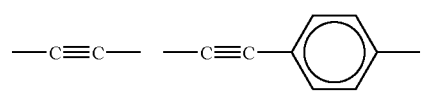

Formula 1

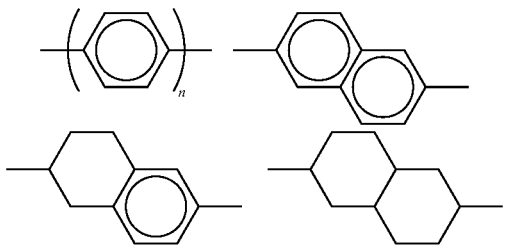

-continued (where n in the formulae is an integer equal to or greater than 2; and any hydrogen atom contained in a ring structure in the formulae may be, independently, substituted by a halogen atom, a cyano group, or an isocyano group).

In a preferred embodiment, the liquid crystal material preferably contains about 25 weight % or more of the molecules having the above chemical structure.

In a preferred embodiment, a spectrum of blue light which is emitted by the light source has a peak wavelength at about 380 nm or more.

In a preferred embodiment, the light source generates substantially no light in an ultraviolet region.

In a preferred embodiment, the light source is a light-emitting diode.

In a preferred embodiment, the light source is an electroluminescence element.

In a preferred embodiment, the light source is a discharge tube.

In a preferred embodiment, the liquid crystal panel performs displaying in a vertical alignment mode.

In a preferred embodiment, the liquid crystal panel performs displaying in an in-plane switching mode.

In a preferred embodiment, the liquid crystal panel further includes a plurality of pixel regions each capable of modulating light emitted from the illuminator, and a switching element provided in each of the plurality of pixel regions.

An electronic apparatus according to a preferred embodiment of the present invention preferably is a liquid crystal display device having the above construction.

In a preferred embodiment, an electronic apparatus according to a preferred embodiment of the present invention further includes circuitry for receiving a television broadcast.

An illuminator of a liquid crystal display device according to a preferred embodiment of the present invention includes a light source causing primary generation of at least blue light, among other light which is used for displaying, and therefore decomposition of the molecules contained in the liquid crystal material due to ultraviolet light is prevented and minimized. As a result, according to a preferred embodiment of the present invention, the reliability of a liquid crystal display device including a liquid crystal layer which is formed of a low-viscosity liquid crystal material can be improved, and thus a liquid crystal display device which is capable of performing high-quality displaying for long hours can be provided.

Other features, elements, steps, characteristics and advantages of the present invention will become more apparent from the following detailed description of preferred embodiments of the present invention with reference to the attached drawings

DETAILED DESCRIPTION OF PREFERRED EMBODIMENTS

The inventor has conducted a detailed analysis of the causes for the aforementioned problems occurring in a liquid crystal display device in which a low-viscosity liquid crystal material is used.

Being a non-emission type display device, a liquid crystal display device includes an illuminator, and display is performed by modulating the light from the illuminator with a liquid crystal panel. As will be described later, the inventor has ascertained that a minute amount of ultraviolet light is emitted from the illuminator. Furthermore, the inventor has ascertained that a liquid crystal material having a low viscosity is likely to contain molecules which are susceptible to decomposition by ultraviolet light (i.e., unstable against ultraviolet light), and found that orientation disturbances and a decrease in the voltage retention rate occur when such molecules are decomposed by the ultraviolet light from the light sources.

In the illuminator of a commonly-used liquid crystal display device, a cold-cathode tube is used as a light source. In the cold-cathode tube, mercury which is enclosed within the tube is excited by discharging to generate ultraviolet light, and this ultraviolet light excites a phosphor which is enclosed in the tube, whereby visible light that is used for displaying (which typically is light containing red, green, and blue light) is generated. In other words, the cold-cathode tube causes primary generation of ultraviolet light, and the ultraviolet light causes secondary generation of visible light.

Not all of the ultraviolet light that is generated from the mercury is used for exciting the phosphor, but a portion thereof is emitted outside the tube and reaches the liquid crystal panel. Although the ultraviolet light emitted outside the tube is so minute that it can hardly be detected with a commonly-used illuminometer, the ultraviolet light will irradiate the liquid crystal panel for long periods of time, thus promoting decomposition of the molecules in the liquid crystal material and causing the aforementioned problems.

In recent years, liquid crystal display devices have come to be used for liquid crystal television sets which display images from a television broadcast. It is contemplated that a liquid crystal television set will be placed in a living room or the like, and used for very long hours. Therefore, a liquid crystal television set is required to have a reliability such that it is capable of performing stable displaying for about forty thousand hours (10 hours/day×365 days×10 years). In such long hours of use, decomposition of molecules due to ultraviolet light from the illuminator presents a major problem.

Hereinafter, preferred embodiments of the present invention will be described with reference to the drawings. Note that the present invention is not to be limited to the preferred embodiments below.

Figure 1:
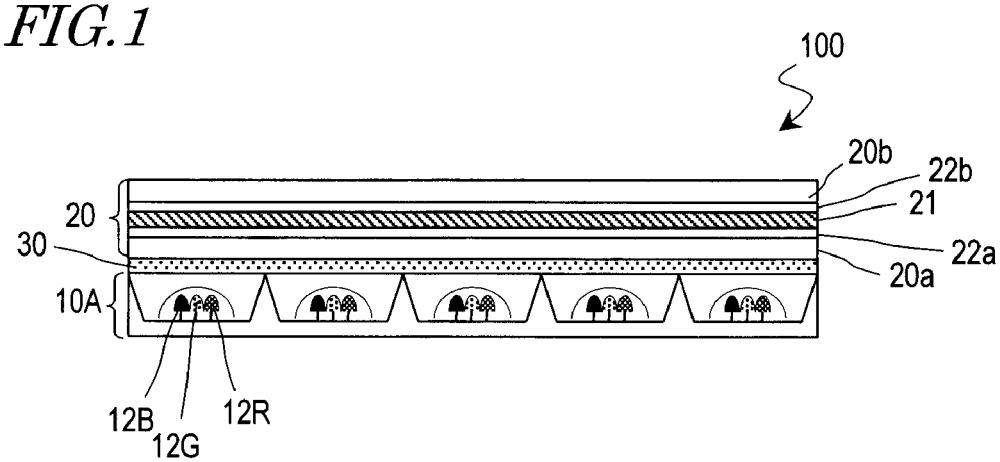
FIG. 1 is a cross-sectional view schematically showing a liquid crystal display device according to a preferred embodiment of the present invention.

FIG. 1 shows a liquid crystal display device 100 according to the present preferred embodiment. The liquid crystal display device 100 preferably includes an illuminator 10A and a liquid crystal panel 20 which performs displaying by using light emitted from the illuminator 10A. A diffusion sheet 30 for diffusing the light from the illuminator 10A is provided between the illuminator 10A and the liquid crystal panel 20.

The liquid crystal panel 20 preferably includes: a pair of substrates (e.g., glass substrates) 20*a* and 20*b*; a liquid crystal layer 21 provided therebetween; and a pair of alignment films 22*a* and 22*b* which are provided on the sides of the pair of substrates 20*a* and 20*b* facing the liquid crystal layer 21. Although not shown in the figure, electrodes for applying a voltage across the liquid crystal layer 21 are formed on the substrates 20*a* and 20*b*.

The illuminator 10A is an LED array which includes a plurality of light-emitting diodes (LEDs) arranged in a matrix array as light sources. Specifically, the illuminator 10A includes red LEDs 12R, green LEDs 12G, and blue LEDs 12B.

Through recombination of electrons and holes occurring at a pn junction where a bias voltage is applied in the forward direction, the red LEDs 12R, green LEDs 12G, and blue LEDs 12B generate red light, green light, and blue light, respectively. In other words, the red LEDs 12R, green LEDs 12G, and blue LEDs 12B cause primary generation of red light, green light, and blue light, respectively; and white light which contains these kinds of light is radiated onto the liquid crystal panel 20 so as to be used for color displaying.

As described above, the illuminator 10A of the liquid crystal display device 100 includes light sources causing primary (i.e., direct) generation of light to be used for displaying, and therefore decomposition of molecules due to ultraviolet light is unlikely to occur even when the liquid crystal layer 21 is formed of a low-viscosity liquid crystal material in order to improve the response characteristics. Hence, orientation disturbances and decrease in the voltage retention rate due to decomposition of the molecules in the liquid crystal layer are unlikely to occur, so that high-quality displaying can be performed for long periods of time.

Although FIG. 1 illustrates an illuminator 10A which includes the red LEDs 12R, green LEDs 12G, and blue LEDs 12B, the present invention is not to be limited thereto. An illuminator that includes blue LEDs and phosphors which absorb light from the blue LEDs and generate light in longer wavelength regions may also be used. For example, an illuminator that includes blue LEDs and red LEDs as well as green phosphors which generate green light by absorbing blue light, or an illuminator that includes blue LEDs, green phosphors, and red phosphors which generate red light by absorbing blue light may be used. By using an illuminator that includes light sources causing primary generation of at least blue light, among other light which is used for displaying, decomposition of the molecules in the liquid crystal layer can be suppressed.

Figure 2:
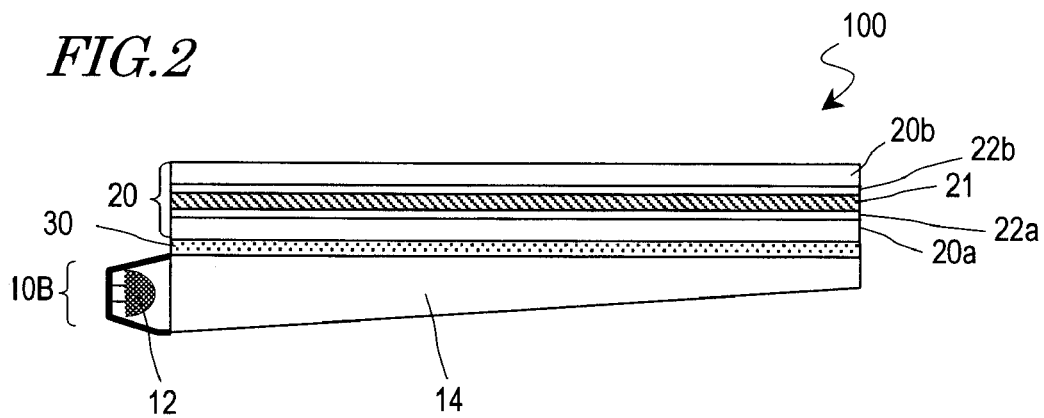
FIG. 2 is a cross-sectional view schematically showing a liquid crystal display device according to a preferred embodiment of the present invention.

Moreover, although the illuminator 10A shown in FIG. 1 is a direct-type illuminator in which LEDs are arranged in a matrix array immediately under the liquid crystal panel 20, any other type of illuminator may be used. For example, as in an illuminator 10B shown in FIG. 2, it may be a sidelight-type illuminator in which an LED 12 is disposed at an end surface of a light guide plate 14 that is provided at the rear surface side of a liquid crystal panel 20 and in which light from the LED 12 is guided by the light guide plate 14 into the liquid crystal panel 20.

Preferred embodiments of the present invention can be suitably used for liquid crystal display devices of various display modes. For example, it may be suitably used for a liquid crystal display device of a twisted nematic (TN) mode, a vertical alignment (VA) mode, or an in-plane switching (IPS) mode.

Figure 3:
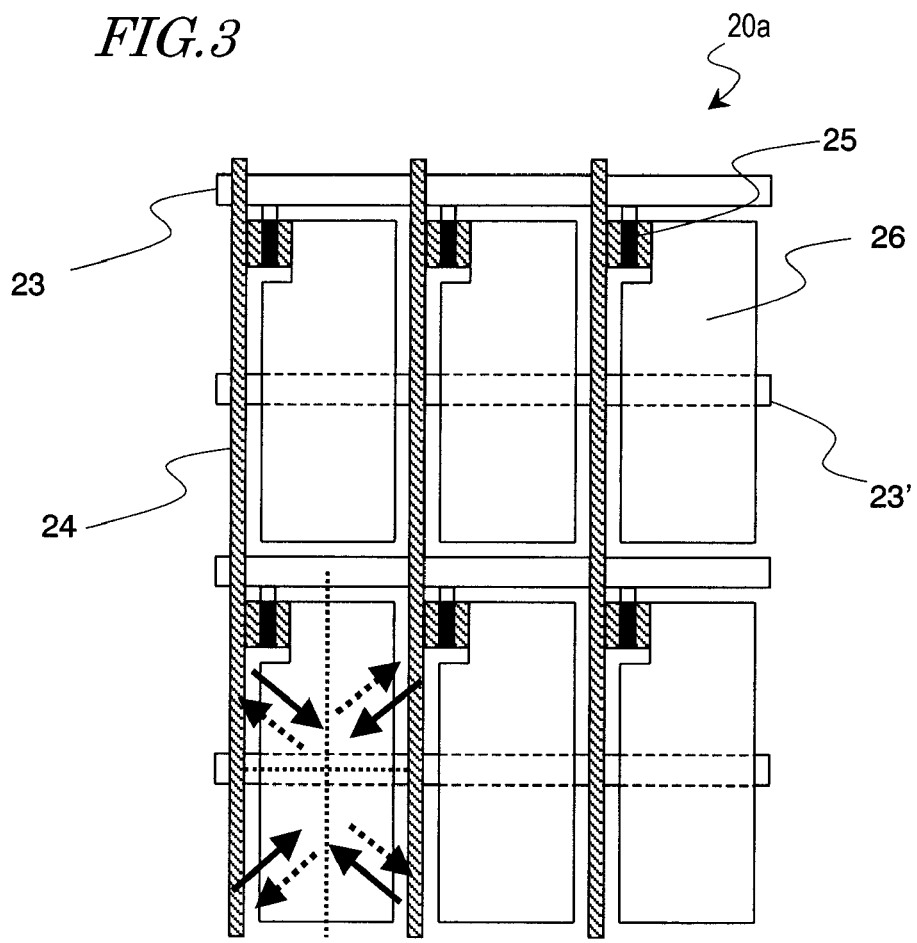
FIG. 3 is an upper plan view schematically showing an active matrix substrate which is used for a VA mode liquid crystal display device.

Now, a VA mode liquid crystal display device will be described. FIG. 3 schematically shows an active matrix substrate 20a of a VA mode liquid crystal panel. Formed on the active matrix substrate 20a are: a plurality of scanning lines 23 extending substantially in parallel to one another; a plurality of signal lines 24 extending in a direction intersecting the scanning lines 23; TFTs 25 electrically connected to corresponding scanning lines 23 and signal lines 24; and pixel electrodes 26 electrically connected to the TFTs 25. Each TFT 25 and each pixel electrode 26 are provided in each one of a plurality of pixel regions arranged in a matrix array. On the active matrix substrate 20a, storage capacitor lines 23' for composing storage capacitors are further formed.

On the surface of the active matrix substrate 20a shown in FIG. 3, an alignment film 22a having vertical alignment properties is formed. The alignment film 22a has been subjected to a predetermined alignment treatment, such that the alignment film 22a defines the pretilt angle and pretilt direction of the liquid crystal molecules. Note that the "pretilt angle" is an angle between the major axis of a liquid crystal molecule whose orientation is regulated by the orientation regulating force of the alignment film surface and the substrate surface. The "pretilt direction" is an azimuthal direction of the major axis of a liquid crystal molecule whose orientation is regulated by the orientation regulating force of the alignment film surface. Since the pretilt direction of a liquid crystal molecule is defined by the orientation regulating force of an alignment film, the direction of the orientation regulating force of an alignment film is also expressed by the term "pretilt direction" in the present specification. As illustrated with respect to a lower left pixel in FIG. 3, the alignment film 22a has different pretilt directions (solid arrows in the figure) respectively for four regions within the pixel region.

Figure 4:
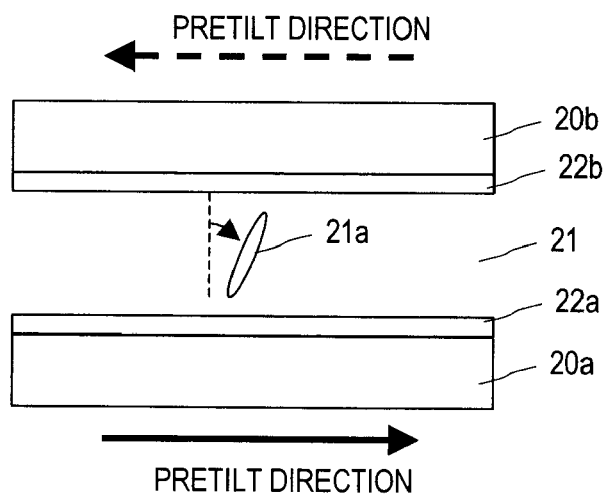
FIG. 4 is a diagram schematically showing a relationship between pretilt directions imparted to alignment films and a tilting direction of a liquid crystal molecule.

Also, an alignment film 22b having vertical alignment properties is formed on the surface of a color filter substrate 20b opposing the active matrix substrate 20a. As shown in FIG. 3, the alignment film 22b has different pretilt directions (dotted arrows in the figure) respectively for four regions within the pixel region. As shown in FIG. 3 and FIG. 4, these pretilt directions are set so as to be opposite to the pretilt directions of the alignment film 22a on the active matrix substrate 20a side.

In the VA mode liquid crystal display device, liquid crystal molecules 21a contained in the liquid crystal layer 21 have a negative dielectric anisotropy such that, under an applied voltage, the liquid crystal molecules 21a having a negative dielectric anisotropy will be tilted from a substantially vertical state. Since the pretilt directions of the alignment films 22a and 22b are set in the above-described manner, under an applied voltage, the liquid crystal layer 21 will form four liquid crystal domains characterized by different orientation directions of the liquid crystal molecules 21a. In other words, each pixel region is orientation-divided into four regions in which liquid crystal molecules will tilt in different directions (four-divided orientation). As a result of this, the viewing angle dependence of displaying is reduced, whereby the viewing angle characteristics are improved.

Figure 5:
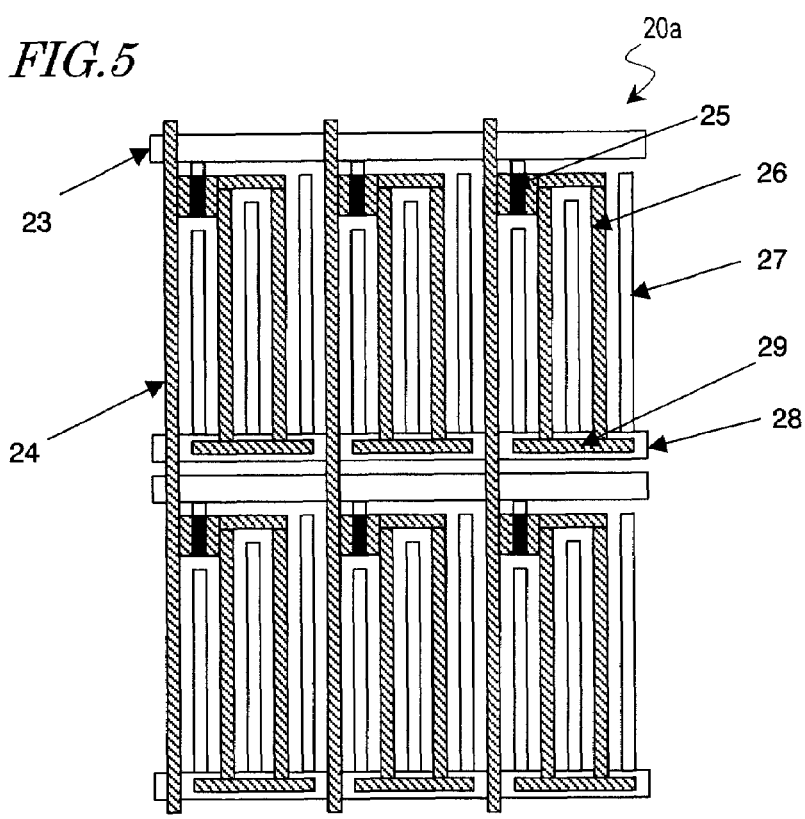
FIG. 5 is an upper plan view schematically showing an active matrix substrate which is used for an IPS mode liquid crystal display device.

Next, an IPS mode liquid crystal display device will be described. FIG. 5 schematically shows an active matrix substrate 20a of an IPS mode liquid crystal panel. Formed on the active matrix substrate 20a are: a plurality of scanning lines 23 extending substantially in parallel to one another; a plurality of signal lines 24 extending in a direction intersecting the scanning lines 23; TFTs 25 electrically connected to corresponding scanning lines 23 and signal lines 24; and pixel electrodes 26 electrically connected to the TFTs 25. The pixel electrodes 26 are formed in the shape of combteeth extending substantially in parallel to the signal lines 24.

On the active matrix substrate 20a, common electrodes 27 are further provided, which are formed in the shape of combteeth that are substantially parallel to the pixel electrodes 26. The common electrodes 27 extend from common lines 28, which are formed substantially in parallel to the scanning lines 23. Via an insulative film (not shown), the common lines 28 oppose storage capacitor electrodes 29, which are formed of the same conductive layer as the pixel electrodes 26, and thus constitute storage capacitors.

On the surface of the active matrix substrate 20a shown in FIG. 5, an alignment film 22a having horizontal alignment properties is formed. Also, on the surface of the color filter substrate 20b opposing the active matrix substrate 20a, an alignment film 22b having horizontal alignment properties is formed.

In an IPS mode liquid crystal display device, liquid crystal molecules contained in the liquid crystal layer 21 have a positive dielectric anisotropy such that, under an applied voltage, their orientation directions are changed by lateral fields which are generated between the pixel electrodes 26 and the common electrodes 27 (electric fields which are parallel to the layer plane of the liquid crystal layer). In an IPS mode liquid crystal display device, good viewing angle characteristics are realized because the orientation directions of the liquid crystal molecules vary within the plane which is parallel to the liquid crystal layer 21.

Note that the IPS mode has a problem in that a coloring phenomenon occurs when observed in an oblique direction (a direction which is tilted from the substrate-plane normal direction). Specifically, the light becomes bluish when observed in the longitudinal direction of the liquid crystal molecules, whereas the light becomes yellowish when observed in the minor-axis direction of the liquid crystal molecules. In other words, the light passing through the liquid crystal layer in an oblique manner (in a direction tilted from the layer normal direction) may become bluish or yellowish. This is because retardation of the liquid crystal molecules has a wavelength dispersion (wavelength dependence).

Figure 6:
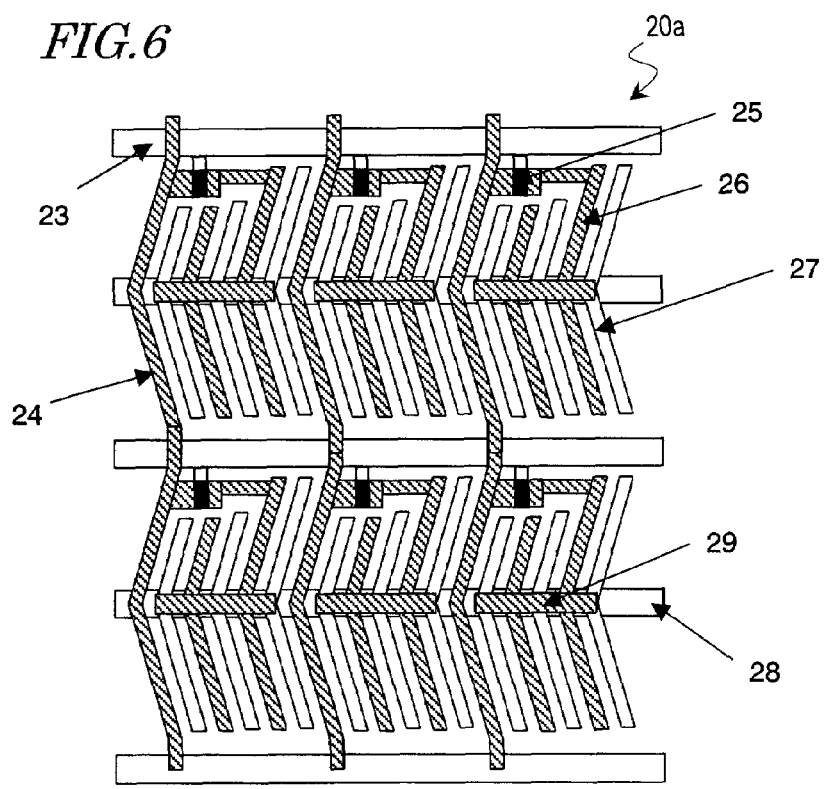
FIG. 6 is an upper plan view schematically showing an active matrix substrate which is used for an IPS mode liquid crystal display device.
Figure 7:
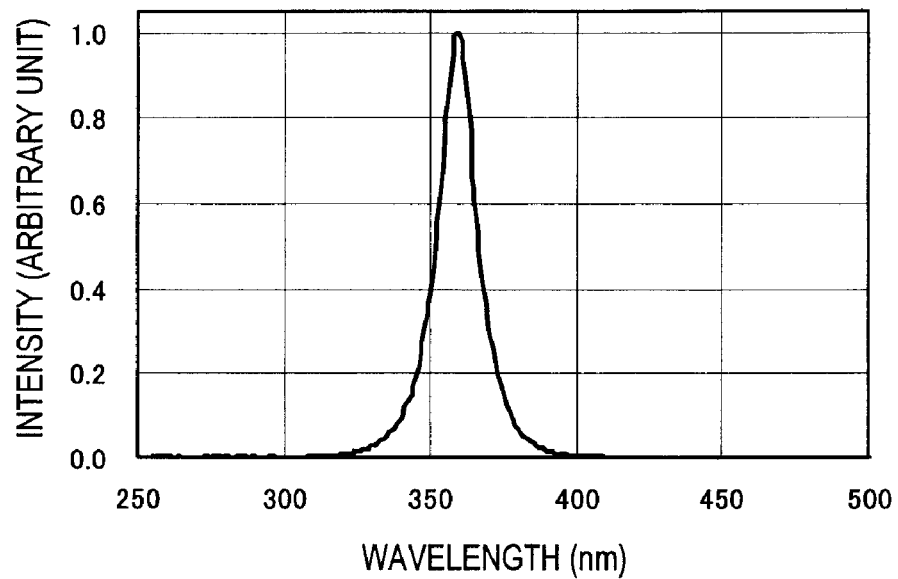
FIG. 7 is a graph showing an emission spectrum of blue LED #1 used for a prototype liquid crystal display device.
Figure 8:
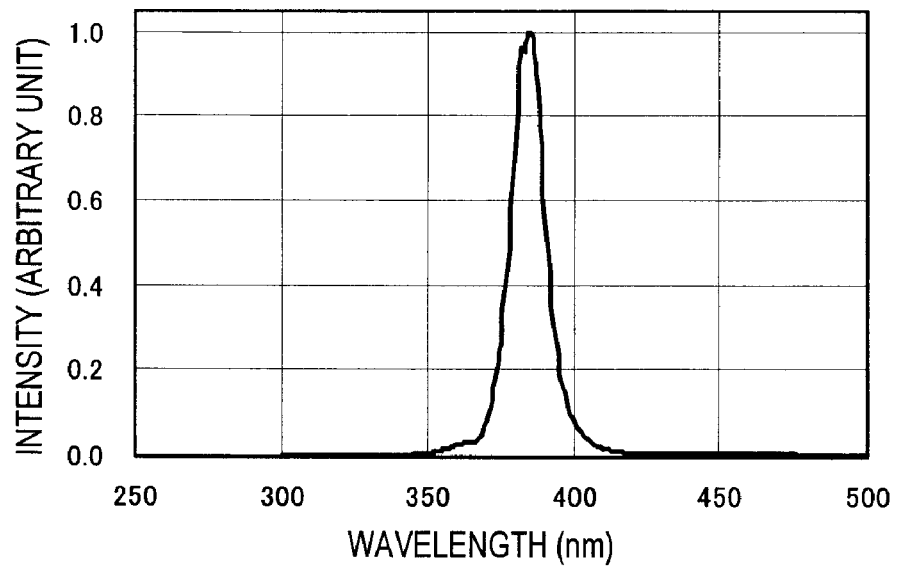
FIG. 8 is a graph showing an emission spectrum of blue LED #2 used for a prototype liquid crystal display device.
Figure 9:
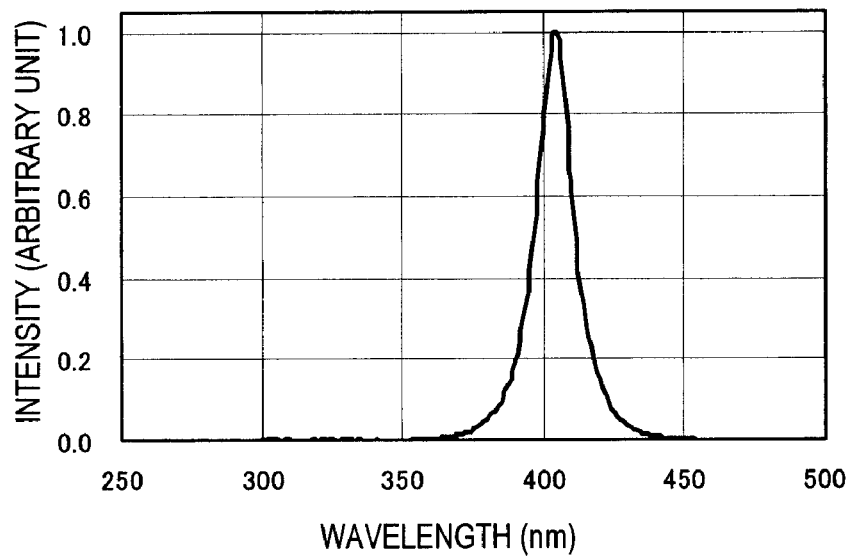
FIG. 9 is a graph showing an emission spectrum of blue LED #3 used for a prototype liquid crystal display device.
Figure 10:
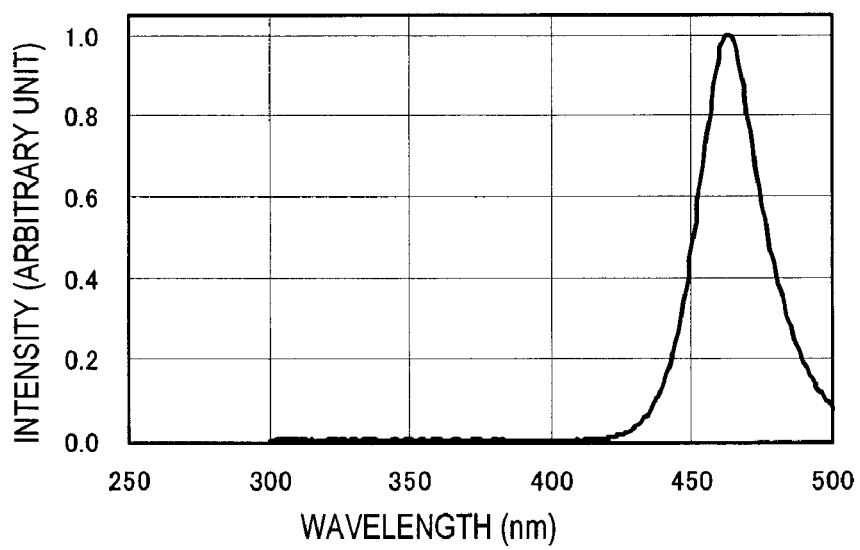
FIG. 10 is a graph showing emission spectrum of blue LED #4 used for a prototype liquid crystal display device.

In order to suppress the aforementioned coloring phenomenon, a construction as shown in FIG. 6 may be adopted. An active matrix substrate 20a shown in FIG. 6 includes signal lines 24 which are bent a plurality of times (zigzag-shaped), as well as pixel electrodes 26 and common electrodes 27 which are bent so as to be substantially parallel to the signal lines 24 (in the "<" shape).

Since the pixel electrodes 26 and the common electrodes 27 have bent shapes as described above, under an applied voltage, two regions characterized by different orientation directions of the liquid crystal molecules are created in each pixel region. Therefore, when observed in a certain oblique direction, each region causes the wavelength region of light to be shifted to a hue of a complementary color, whereby the coloring phenomenon is suppressed.

Next, low-viscosity liquid crystal materials containing molecules which are unstable against ultraviolet light will be specifically described. Note that a liquid crystal material is generally a mixture of a plurality of types of molecules (compounds), and any molecule composing the liquid crystal material may not necessarily exhibit liquid crystal properties as a simple substance.

When molecules having at least one of a carbon-carbon triple bond and a polycyclic group are mixed in a liquid crystal material, the viscosity of the liquid crystal material is lowered, whereby the response characteristics of the liquid crystal display device can be improved. Although molecules having at least one of a carbon-carbon triple bond and a polycyclic group have low stability against ultraviolet light, the present invention suppresses decomposition of such molecules, whereby a decrease in the voltage retention rate and display unevenness can be prevented. In particular, when using a liquid crystal material whose coefficient of rotational viscosity $\gamma_1$ at approximately 20° C. is about 120 mPa·s or less, there is a large significance in using preferred embodiments of the present invention because decrease in the voltage retention rate and display unevenness are likely to occur. Note that, in the present specification, "polycyclic groups" refer to both non-condensed polycyclic groups and condensed polycyclic groups.

Examples of molecules having at least one of a carbon-carbon triple bond and a polycyclic group include molecules having a chemical structure expressed by any of the following formulae. By mixing such molecules into the liquid crystal material, it can be easily ensured that the coefficient of rotational viscosity $\gamma_1$ of the liquid crystal material at approximately 20° C. is about 120 mPa·s or less. Note that n in the following formulae is an integer equal to or greater than 2, and any hydrogen atom contained in a ring structure in the following formulae may independently be substituted by a halogen atom, a cyano group, or an isocyano group.

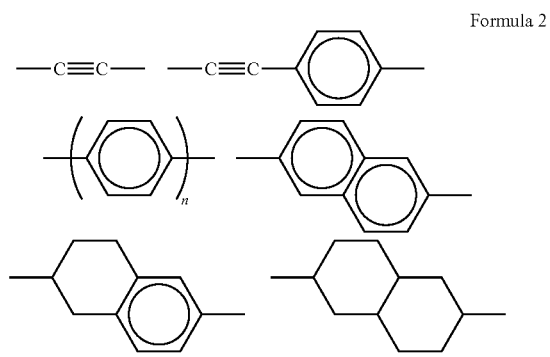

Formula 2

By mixing about 25 weight % or more of molecules having any such chemical structure into the liquid crystal material, the viscosity of the liquid crystal material is sufficiently lowered, whereby rapid response can be obtained. Specifically, a response time of about one frame or less can be realized, and a level of moving picture performance that is required of a liquid crystal television set can be obtained.

Among molecules having the aforementioned chemical structures, molecules having a tolan group (i.e., molecules including structures expressed by the formulae shown by [formula 5] below, specific examples being molecules expressed by formulae (I) and (VI)) provide great viscosity-reducing effects, and yet have very low stability against ultraviolet due to their triple bonds. Thus, the effects of preferred embodiments of the present invention will be most clearly exhibited for them.

Hereinafter, examples of liquid crystal materials and their constituent molecules will be described more specifically.

As low-viscosity liquid crystal materials, liquid crystal materials containing molecules expressed by formula (I) below can be used, for example. In formula (I), m and n are integers equal to or greater than 1. Liquid crystal materials containing molecules as expressed by formula (I) are disclosed in IDW '00, p. 77, for example, and can have a coefficient of rotational viscosity $\gamma_1$ of about 111 to about 114 mPa·s at 20° C.

Formula 3

$$C_mH_{2m+1}\!-\!\!\bigcirc\!\!-\!C\!\equiv\!C\!-\!\!\bigcirc\!\!-\!\!\bigcirc\!\!-\!C_nH_{2n+1}$$

(I)

Alternatively, liquid crystal materials containing molecules which are expressed by formula (II) below can be used. In formula (II), each of A and B is independently a cyclohexylene, a phenylene, a phenylene some of whose H's are substituted by F's, or a cyclohexylene at least one of whose H's is substituted by D; at least one of $Z_1$ and $Z_2$ is —C≡C—; R1 is an alkyl, an alkenyl, an oxaalkyl, or an alkoxy (where preferably the number of C's is no less than 1 and no more than 10); and $X_1$, $X_2$, and $X_3$ are H or F. Typically, $X_2$ is F, and at least one of $X_1$ and $X_3$ is F.

Formula 4

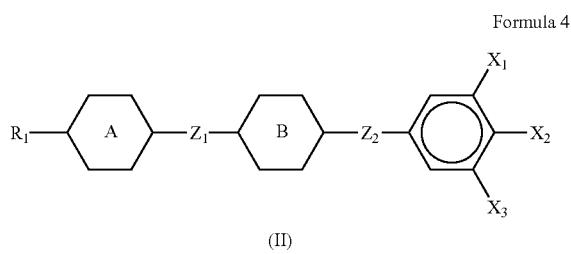

(II)

Liquid crystal materials containing molecules as expressed by formula (II) are disclosed in Japanese Laid-Open Patent Publication No. 10-292173, for example, and can have a coefficient of rotational viscosity $\gamma_1$ of about 28 mPa·s or less at 20° C. Molecules expressed by formula (II) include structures expressed by the following formulae, for example.

Formula 5

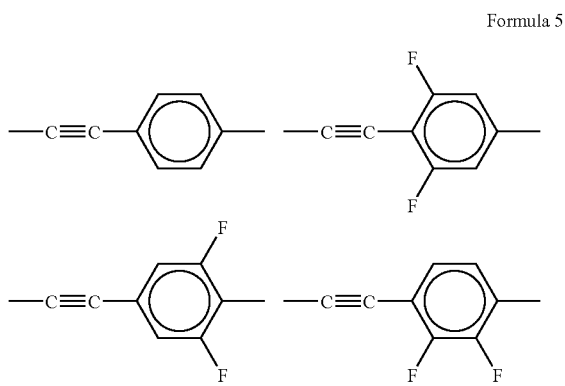

Alternatively, liquid crystal materials containing molecules expressed by formulae (III), (IV) and (V) below can be used. In formulae (III), (IV), and (V), R is an alkyl, an alkenyl, an oxaalkyl, or an alkoxy; each of $X_1$, $X_2$, $X_3$, and $X_4$ is, independently, H or F; and Y is F, —$CF_3$, —$OCF_3$, —$OCHF_2$, —$OCH_2F$, or R. Liquid crystal materials containing molecules as expressed by formulae (III), (IV), and (V) are disclosed in Japanese Laid-Open Patent Publication No. 2002-38154, for example.

Formula 6

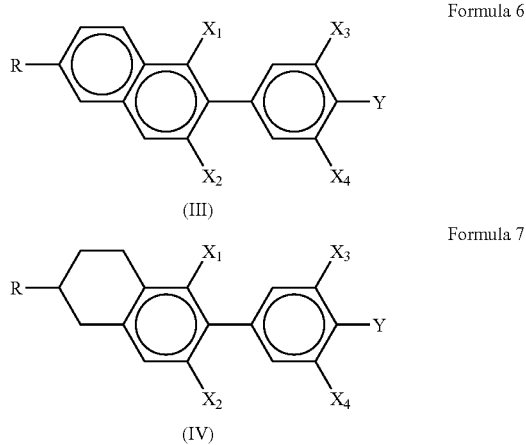

(III)

Formula 7

(IV)

Formula 8

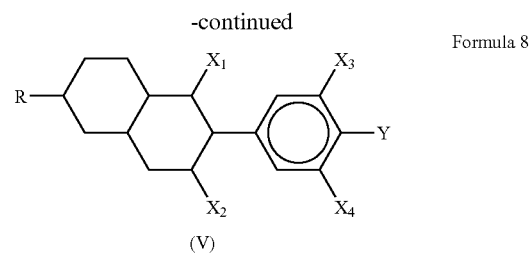

(V)

Moreover, liquid crystal materials containing molecules expressed by formula (VI) can be used for an IPS mode liquid crystal display device (having an active matrix substrate 20a as shown in FIG. 5 or FIG. 6, for example). In formula (VI), m and n are integers equal to or greater than 1.

Formula 9

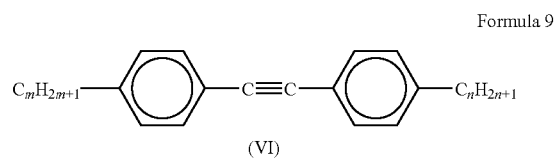

(VI)

Liquid crystal materials containing molecules as expressed by formula (VI) are disclosed in Japanese Laid-Open Patent Publication No. 7-316556, for example. As is disclosed in this publication as Example 3, a liquid crystal material in which molecules expressed by formula (VI) and molecules expressed by formula (VII) are mixed has a coefficient of rotational viscosity $\gamma_1$ of about 20 mPa·s at approximately 20° C.

Formula 10

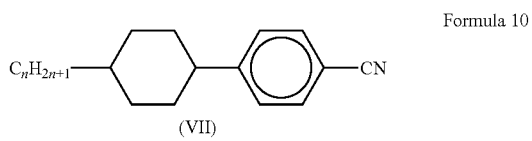

(VII)

Furthermore, liquid crystal materials containing molecules expressed by formula (VIII), (IX), and (X) can be used for a VA mode liquid crystal display device (having an active matrix substrate 20a as shown in FIG. 3, for example). In formula (VIII), (IX), and (X), each of $X_1$ to $X_6$ is, independently, a hydrogen atom, a halogen atom, a cyano group, or an isocyano group. However, it is preferable that at least one of $X_1$, $X_2$ and $X_3$, at least one of $X_4$ and $X_5$, and $X_6$ are not hydrogen atoms. Moreover, those of $X_1$ to $X_6$ which are not hydrogen atoms are preferably halogen atoms, and more preferably fluorine atoms.

Formula 11

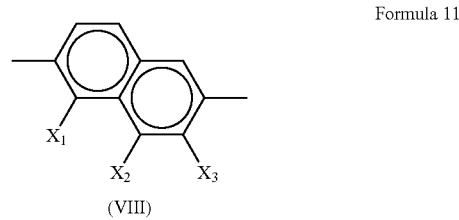

(VIII)

-continued

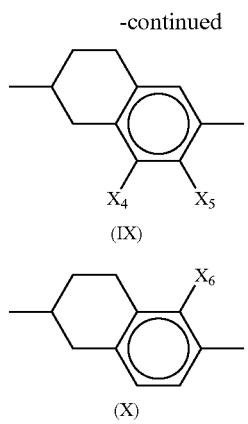

Formula 12

(IX)

Formula 13

(X)

Liquid crystal materials containing molecules as expressed by formula (VIII), (IX), and (X) are disclosed in Japanese Laid-Open Patent Publication No. 2002-69449, for example. A liquid crystal material which is disclosed in this publication as Example 1 has a negative dielectric anisotropy, and can be used for a VA mode liquid crystal display device.

Next, results of evaluating the reliability of actually-produced liquid crystal display devices will be described. The inventor has actually produced liquid crystal display devices each including a liquid crystal panel having a liquid crystal layer which is formed of a low-viscosity liquid crystal material and an illuminator including light sources causing primary generation of light to be used for displaying, and evaluated their reliabilities.

First, the VA mode active matrix substrate 20*a* shown in FIG. 3 and the color filter substrate 20*b* were produced by known techniques. On the surfaces of the active matrix substrate 20*a* and the color filter substrate 20*b*, an alignment film material whose main structure is polyimide and which has a side chain that induces vertical alignment properties as well as a photoreactive side chain composed of a chalcone group was applied so as to form alignment films, and these alignment films were irradiated with polarized ultraviolet light from a direction oblique to the substrate-plane normal direction. The active matrix substrate thus produced was attached to the color filter substrate, and a liquid crystal material was injected into the gap therebetween, thus producing a liquid crystal panel. As the liquid crystal material, a liquid crystal material containing molecules having a naphthalene group was used.

Figure 11:
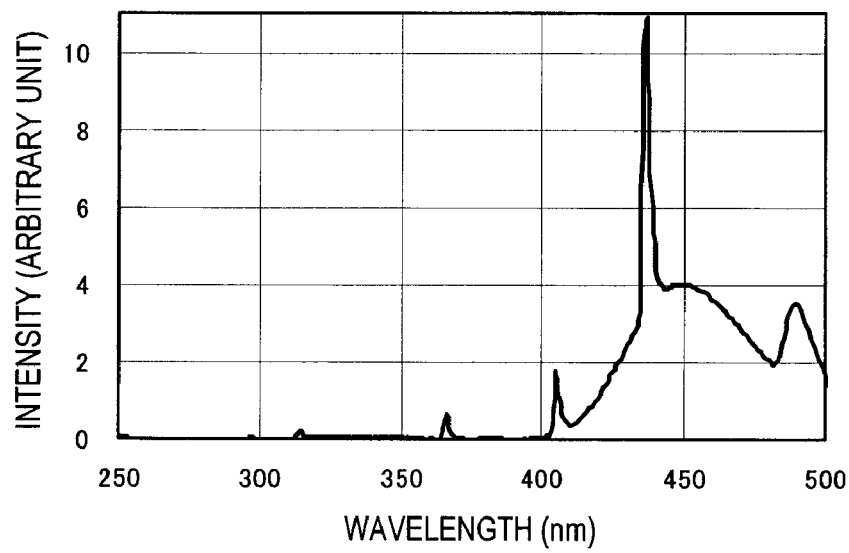
FIGS. 11 (*a*) and (*b*) are graphs showing an emission spectrum of a cold-cathode tube (CCFL) used for a liquid crystal display device of a comparative example.
Figure 11:
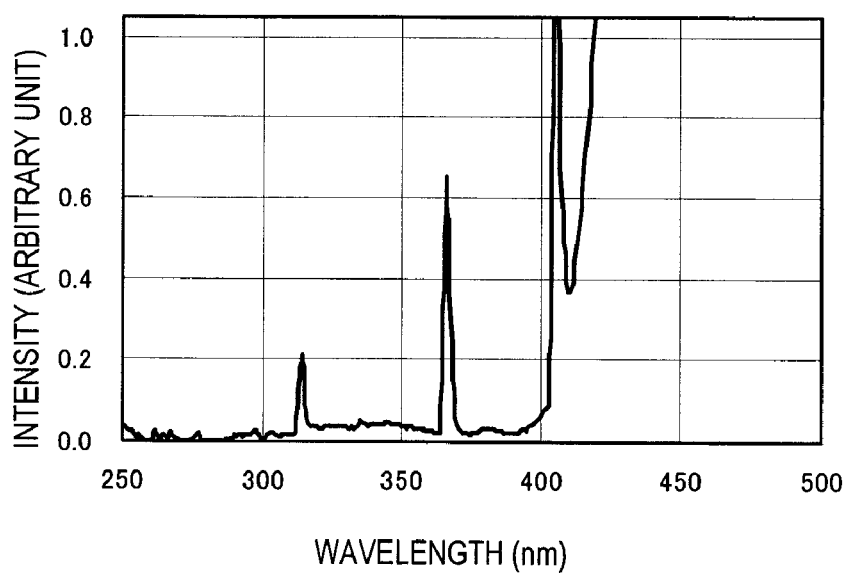

A plurality of liquid crystal panels as described above were produced, and on the rear surfaces of these liquid crystal panels, illuminators #1 to #4 having red LEDs, green LEDs and blue LEDs were provided, thus producing liquid crystal display devices (Prototypes 1 to 4). Moreover, illuminator #5 having a cold-cathode tube (CCFL) was provided on the rear surface of a liquid crystal panel as described above, thus producing a liquid crystal display device (Comparative Example 1). The emission spectra of blue LEDs #1 to #4 used for illuminators #1 to #4 are shown in FIG. 7 to FIG. 10, whereas the emission spectrum of the cold-cathode tube (CCFL) used for illuminator #5 is shown in FIGS. 11(*a*) and (*b*). Note that FIG. 11(*b*) is a graph obtained by magnifying the vertical axis of FIG. 11(*a*) by 10 times. The peak wavelengths of blue LEDs #1 to #4 are shown in Table 1.

TABLE 1

|  | LED #1 | LED #2 | LED #3 | LED #4 |
| --- | --- | --- | --- | --- |
| peak wavelength (nm) | 365 | 382 | 405 | 465 |

The liquid crystal display devices of Prototypes 1 to 4 and the liquid crystal display device of Comparative Example 1 were observed with respect to aging. However, in order to conduct accelerated tests, the luminance of the light sources was set so as to be 10 times as large as the usual luminance.

In the liquid crystal display devices of Prototypes 1 to 4, no changes occurred after 500 hours. However, in the liquid crystal display device of Comparative Example 1, changes began to occur in the orientation directions (pretilt directions) after 500 hours, and a decrease in the voltage retention rate was also observed.

Moreover, in the liquid crystal display device of Comparative Example 1, changes in the orientation directions became greater after 1000 hours, and conspicuous display unevenness was observed. On the other hand, among the liquid crystal display devices of Prototypes 1 to 4, a slight decrease in the voltage retention rate was observed for Prototype 1, but no change was observed for Prototypes 2 to 4.

The changes in the orientation directions and decrease in the voltage retention rate in the liquid crystal display device of Comparative Example 1 are ascribable to the ultraviolet light which is generated by the cold-cathode tube of illuminator #5. As shown in FIGS. 11(*a*) and (*b*), the emission spectrum of the cold-cathode tube exhibits peaks at 313 nm (j line) and 365 nm (i line). These peaks correspond to emission lines that are characteristic of mercury emission, and are present in the emission spectrum of a cold-cathode tube due to its principles. These emission lines cause deterioration of the molecules, and thus lower the reliability.

The light near the 313 nm peak, in particular, contributes much to the decomposition of the molecules in the liquid crystal layer. The reason thereof is described below.

Absorption wavelength bands of a carbon-carbon (C—C) bond, a carbon-hydrogen (C—H) bond, and benzene are toward the shorter-wavelength side from 300 nm. Therefore, these bonds are unlikely to be severed by mercury emission. However, if any conjugated system exists in the molecules, the absorption wavelength will shift toward the longer-wavelength side. Moreover, the amount of shift will depend on the number and length of conjugated systems. For example, shifts toward the longer-wavelength side may occur as follows: benzene has an absorption wavelength of 261 nm, whereas naphthalene has that of 312 nm and anthracene has that of 375 nm.

In the case of compounds that have significant viscosity-reducing characteristics for improving the response characteristics of the liquid crystal display device, i.e., compounds having a conjugated system such as a naphthalene group, a biphenyl group, or a carbon-carbon triple bond (already described), the absorption wavelength also shifts to 300 nm or more. Therefore, out of the light which is generated by mercury, it is the 313 nm light (j line) that is most influential on the decomposition of molecules, followed by the 365 nm light (i line).

In the case of a compound which causes a large amount of shift and has an absorption peak near 365 nm (i line), for example, the 365 nm (i line) light is the most influential light. In this case, however, the absorption edge reaches the visible region so that blue light will be slightly absorbed. As a result, the compound itself will become yellowish, which is not favorable from the standpoint of display characteristics. After all, in a liquid crystal material in which both viscosity and hue are optimized, it is the 313 nm light (j line) that is most influential on the decomposition of molecules, followed by the 365 nm light (i line).

On the other hand, blue LEDs #1 to #4 cause primary generation of blue light, and thus the emission spectra of blue LEDs #1 to #4 do not have a peak at least near 313 nm, as shown in FIG. 7 to FIG. 10. Therefore, the light which is generated by blue LEDs #1 to #4 is unlikely to decompose the molecules in the liquid crystal layer.

As described above, it has been confirmed that the reliability of a liquid crystal display device comprising a liquid crystal layer which is formed of a low-viscosity liquid crystal material is improved by using an illuminator that includes light sources causing primary generation of at least blue light, among other light which is used for displaying.

Note that, as can be seen from the fact that a slight decrease in the voltage retention rate was observed in Prototype 1 after 1000 hours, from the standpoint of further improving the reliability, it is preferable that the blue light which is generated by the light sources has a spectrum such that its peak wavelengths are at 380 nm or more (i.e., so as to fall within the visible region), as is the case with blue LEDs #2 to #4 of Prototypes 2 to 4. Moreover, it is more preferable that the peak wavelengths are at 400 nm or more as is the case with blue LEDs #3 and #4, and it is further preferable that substantially no light in the ultraviolet region is generated as is the case with blue LED #4. The reason is that, since the absorption edge of an organic compound has an extent (i.e., the absorption spectrum has a wide breadth), even ultraviolet light in a region close to the visible region (i.e., on the higher-wavelength side of the j line and the i line) will slightly contribute to decomposition of molecules, and will be cumulated during hours of use of the liquid crystal television set (e.g., 40000 hours) to exhibit an influence.

Next, the active matrix substrate 20a for the IPS mode shown in FIG. 5 and the color filter substrate 20b were produced by known techniques. On the surfaces of the active matrix substrate 20a and the color filter substrate 20b, an alignment film material having horizontal alignment properties (i.e., causing hardly any pretilt) was applied so as to form alignment films, and these alignment films were irradiated with polarized ultraviolet light from the substrate-plane normal direction. The active matrix substrate thus produced was attached to the color filter substrate, and a liquid crystal material was injected into the gap therebetween, thus producing a liquid crystal panel. As the liquid crystal material, a liquid crystal material containing molecules having a tolan group was used.

A plurality of liquid crystal panels as described above were produced, and on the rear surfaces of these liquid crystal panels, illuminators #1 to #4 having red LEDs, green LEDs and blue LEDs were provided, thus producing liquid crystal display devices (Prototypes 5 to 8). Moreover, illuminator #5 having a cold-cathode tube (CCFL) was provided on the rear surface of a liquid crystal panel as described above, thus producing a liquid crystal display device (Comparative Example 2).

The liquid crystal display devices of Prototypes 5 to 8 and the liquid crystal display device of Comparative Example 2 were observed with respect to aging. However, in order to conduct accelerated tests, the luminance of the light sources was set so as to be 10 times as large as the usual luminance.

In the liquid crystal display device of Prototypes 5 to 8, no changes occurred after 500 hours. However, in the liquid crystal display device of Comparative Example 2, changes began to occur in the orientation directions (pretilt directions) after 500 hours, and a decrease in the voltage retention rate was also observed.

Moreover, in the liquid crystal display device of Comparative Example 2, changes in the orientation directions became greater after 1000 hours, and conspicuous display unevenness was observed. On the other hand, among the liquid crystal display devices of Prototypes 5 to 8, a slight decrease in the voltage retention rate was observed for Prototype 5, no change was observed for Prototypes 6 to 8.

As described above, it has been confirmed that the reliability of an IPS mode liquid crystal display device including a liquid crystal layer which is formed of a low-viscosity liquid crystal material is improved by using an illuminator that includes light sources causing primary generation of at least blue light, among other light which is used for displaying.

Note that preferred embodiments of the present invention are applicable to liquid crystal display devices of various display modes, and may be used for a TN mode liquid crystal display device, for example, without being limited to the VA mode and IPS mode described above.

Figure 12:
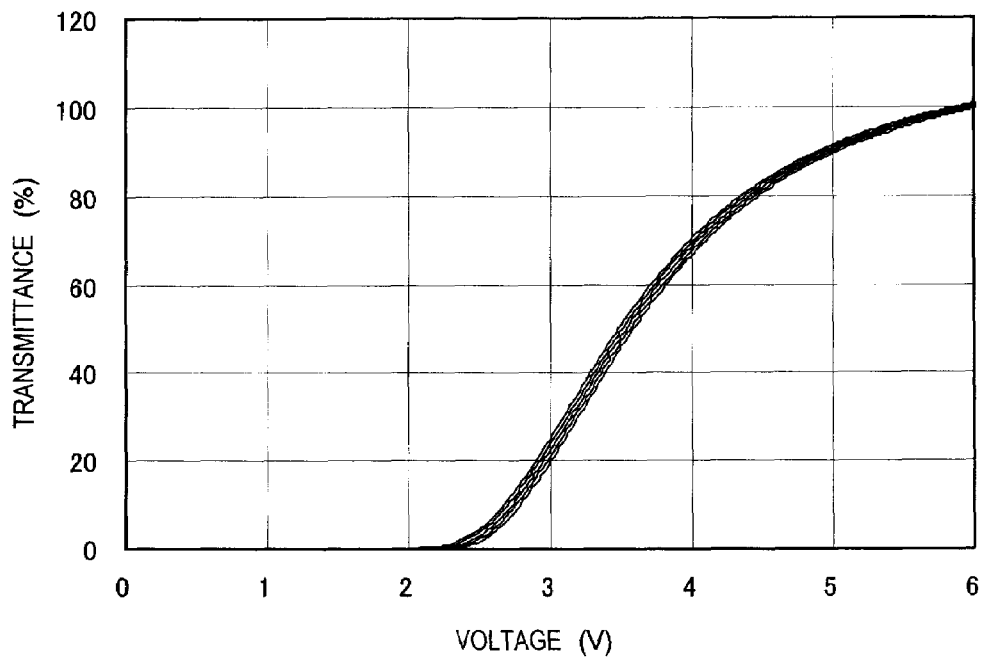
FIG. 12 is a graph showing a voltage-transmittance curve of a VA mode liquid crystal display device.
Figure 13:
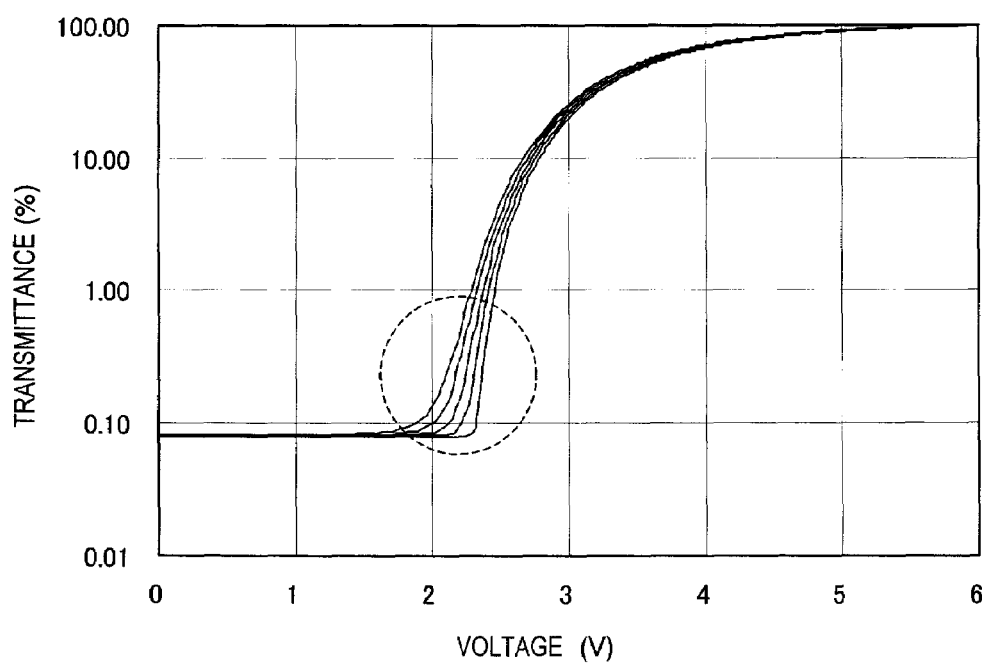
FIG. 13 is a graph showing a voltage-transmittance curve of a VA mode liquid crystal display device, where transmittance is shown in logarithm on the vertical axis.
Figure 14:
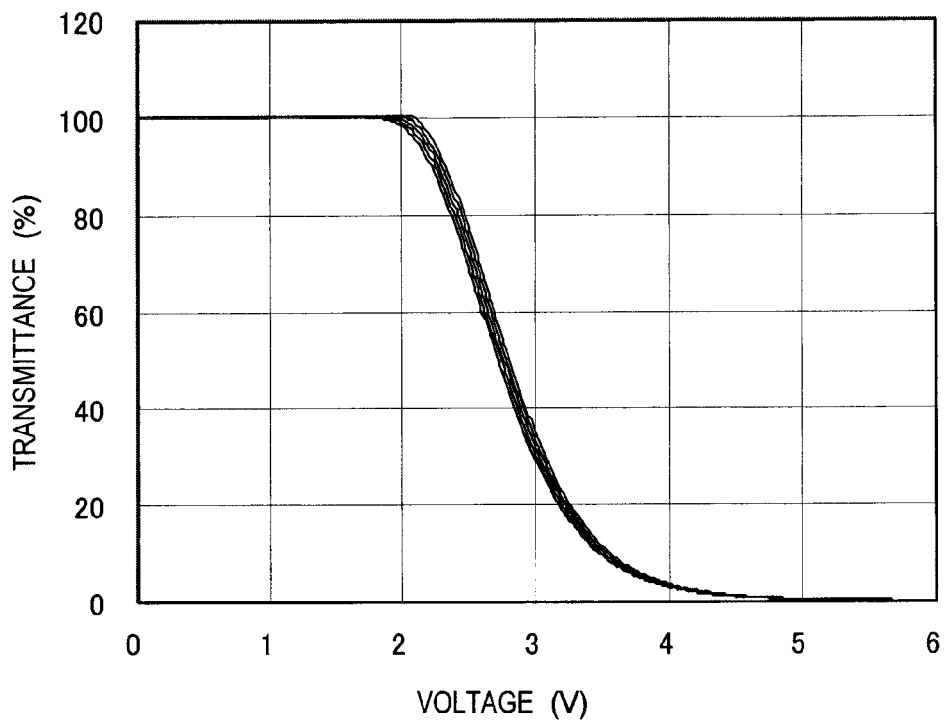
FIG. 14 is a graph showing a voltage-transmittance curve of a TN mode liquid crystal display device.
Figure 15:
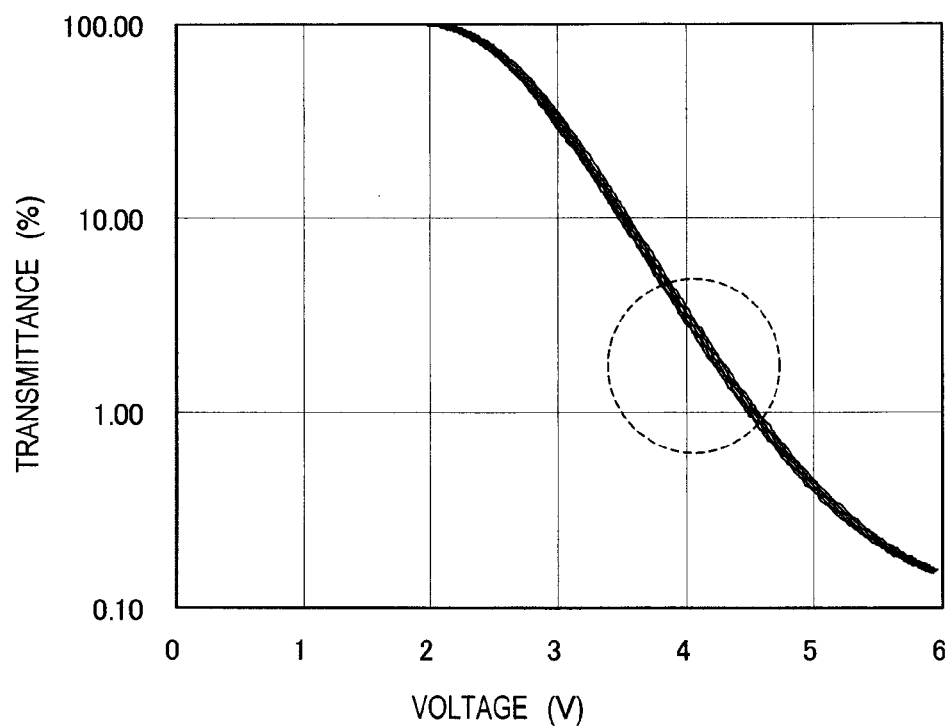
FIG. 15 is a graph showing a voltage-transmittance curve of a TN mode liquid crystal display device, where transmittance is shown in logarithm on the vertical axis.

However, the effects of improving reliability were higher for the VA mode than for the TN mode. The reason thereof will be described with reference to FIG. 12 to FIG. 15. FIG. 12 and FIG. 13 are graphs showing voltage-transmittance curves of a VA mode liquid crystal display device. FIG. 14 and FIG. 15 are graphs showing voltage-transmittance curves of a TN mode liquid crystal display device. The five curves shown in FIG. 12 and FIG. 13 indicate, from the uppermost curve, cases where the pretilt angles are 87.9°, 88.4°, 88.9°, 89.4°, and 89.9°. The five curves shown in FIG. 14 and FIG. 15 indicate, from the uppermost curve, cases where the pretilt angles are 0.1°, 0.6°, 1.1°, 1.6°, and 2.1°.

As can bee seen from a comparison between FIGS. 12 and 13 and FIGS. 14 and 15, and in particular from a comparison between FIG. 13 and FIG. 15 where the transmittance is shown in logarithm on the vertical axis, the voltage-transmittance curves at the black level to low-luminance gray scale levels (i.e., portions surrounded by broken lines in FIG. 13 and FIG. 15) are steeper and the amount of change in transmittance with respect to changes in the pretilt angles is greater in the VA mode than in the TN mode. Note that the gray scale level has an exponential relationship with transmittance. For example, the transmittance $T_n$ at an $n^{th}$ gray scale level in 256 gray scale-level displaying is expressed as $T_n=(n/255)^{2.2}$. Therefore, in order to discuss the relationship between gray scale levels and transmittance, it is preferable to employ semi-logarithmic plotting as in FIG. 13 and FIG. 15.

Since the amount of change in transmittance with respect to changes in the pretilt angles is greater in the VA mode as mentioned above, in the VA mode, display unevenness may occur even if slight changes occur in the pretilt angles due to decomposition of the molecules in the liquid crystal layer. Therefore, the reliability-improving effects achieved by preferred embodiments of the present invention are high. Moreover, in the case where alignment division is adopted, changes in the pretilt angles may cause changes in the positions of the boundaries between domains, whereby displaying coarseness may be observed. Therefore, the reliability-improving effects are especially high in a VA mode where orientation division is adopted.

Moreover, preferred embodiments of the present invention provide high reliability-improving effects also in the IPS mode. In the IPS mode, displaying is performed by generating lateral fields using combteeth-like electrodes. However, since no lateral fields occur above the electrodes, the portions where the electrodes are formed do not contribute to displaying. Therefore, the effective aperture ratio is lower than that in the TN mode or the VA mode, and is typically about half of that in the TN mode or the VA mode. For this reason, in order to obtain the same luminance as in the TN mode or the VA mode, it is necessary to increase the brightness of the light sources to about twice. If an illuminator including a cold-cathode tube is employed as in the conventional case, decomposition of the molecules in the liquid crystal layer is likely to occur. Hence, the reliability-improving effects of the present invention are high.

Furthermore, the reliability-improving effects achieved by preferred embodiments of the present invention will also be clear in an FFS (fringe field switching) mode where, as in the IPS mode, the alignment state of a horizontal alignment type liquid crystal layer is controlled by using lateral fields.

Preferred embodiments of the present invention are suitably used in a passive matrix-type liquid crystal display device or an active matrix-type liquid crystal display device, but provides clear effects especially in an active matrix-type liquid crystal display device. In an active matrix-type liquid crystal display device where a switching element (e.g., a TFT) is provided in each pixel, the charge which is charged in the pixel capacitance must be retained during one frame. If the molecules in the liquid crystal layer are decomposed by ultraviolet light, the voltage retention rate will decrease, thus resulting in a lower display quality. According to preferred embodiments of the present invention, such a decrease in the voltage retention rate can be suppressed, and therefore active matrix driving can be performed in a favorable manner.

Note that ultraviolet light is also contained in external light entering the liquid crystal panel 20, and the light which is generated by blue LEDs may also contain a slight amount of light in the ultraviolet region. Therefore, in order to more certainly suppress decomposition of molecules due to ultraviolet light, members for absorbing ultraviolet light may be provided at the illuminator side or the viewer side of the liquid crystal layer 21, or members positioned at the illuminator side and the viewer side of the liquid crystal layer 21 may be formed from a material which absorbs ultraviolet light.

However, in a liquid crystal display device incorporating an illuminator which includes a cold-cathode tube, decomposition of the molecules in the liquid crystal layer will occur even if members for absorbing ultraviolet light are provided. Polarizing plates having TAC (triacetyl cellulose) films, which contain an ultraviolet absorber, were used in the aforementioned Prototype- and Comparative-Example liquid crystal display devices, but decomposition of molecules nonetheless occurred in the Comparative Examples. This is because even a member which absorbs ultraviolet light cannot absorb all of the ultraviolet light that is generated upon light emission due to its principles.

Figure 16:
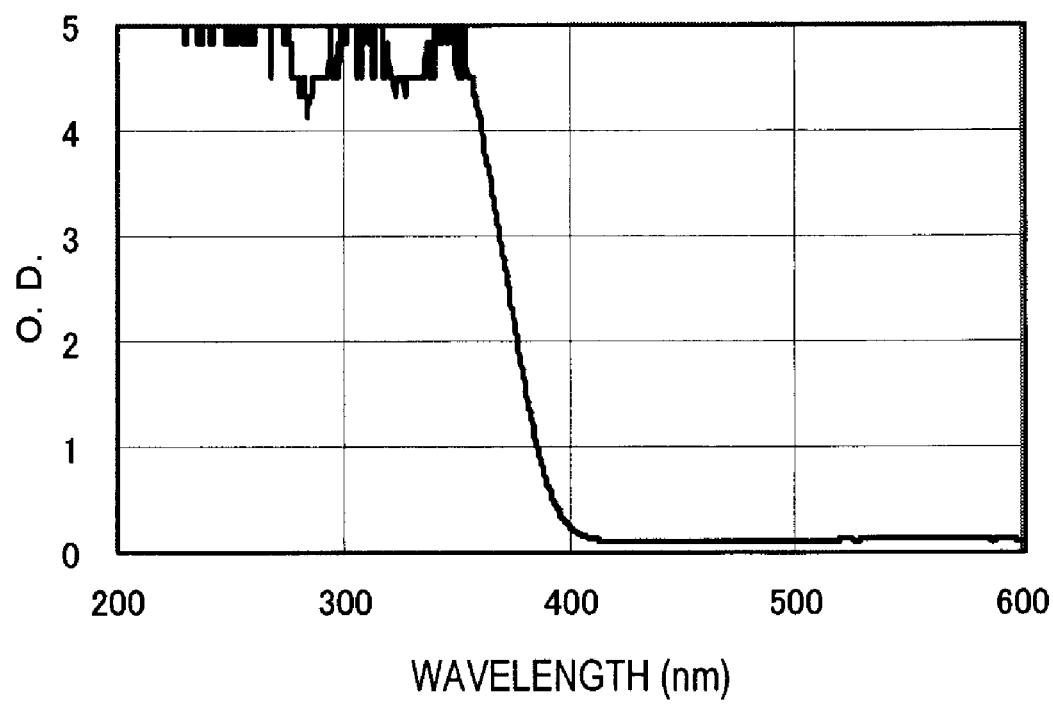
FIG. 16 is a graph showing an absorption spectrum of a TAC film containing an ultraviolet absorber.

FIG. 16 shows an absorption spectrum of a TAC film containing an ultraviolet absorber. As can be seen from FIG. 16, this TAC film has absorptivity with respect to light of a wavelength of 400 nm or less. However, its OD (Optical Density) value is about 1 to 4, and thus it is not able to completely absorb ultraviolet light. Therefore, even ultraviolet light which is so feeble that it cannot be detected by an illuminometer may, when radiated onto the liquid crystal layer for long hours, reach a point where its cumulative energy decomposes the molecules.

Although the preferred embodiments described herein illustrate LEDs as light sources, this is not a limitation. Any light source can be broadly used which cause primary generation of at least blue light. For example, electroluminescence (EL) elements can be used. Note that LEDs may sometimes be referred to as EL elements (EL element in the broad sense) because they perform light emission by utilizing electroluminescence. However, in the present specification, "EL elements" refer to intrinsic EL elements such as so-called organic EL elements and inorganic EL elements, and do not refer to injection-type EL elements such as light-emitting diodes (LEDs), unless otherwise specified. An illuminator that includes red EL elements, green EL elements, and blue EL elements may be used, or an illuminator that includes blue EL elements and phosphors which absorb light from the blue EL elements and generate light in longer wavelength regions may also be used. Alternatively, an illuminator that includes white EL elements in which red, green, and blue emission layers are overlaid may be used.

Moreover, it is even possible to use discharge tubes which do not cause primary generation of ultraviolet light, such as neon tubes enclosing a noble gas causing primary generation of light which is used for displaying. For example, since a neon tube enclosing neon is capable of primary generation of fire red and an argon tube enclosing argon is capable of primary generation of blue-green light, a white light source can be obtained by combining a neon tube, an argon tube, and a color filter for adjusting the color balance, for example.

According to preferred embodiments of the present invention, the reliability of a liquid crystal display device including a liquid crystal layer which is formed of a low-viscosity liquid crystal material can be improved, and a liquid crystal display device which is capable of performing high-quality displaying for long hours is provided.

A liquid crystal display device according to preferred embodiments of the present invention can be suitably used for various electronic apparatuses which are expected to be used for long periods of time. For example, it can be suitably used for a liquid crystal television set which includes circuitry for receiving television broadcasts.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A liquid crystal display device comprising:
an illuminator; and
a liquid crystal panel arranged to perform a display operation using light which is emitted from the illuminator; wherein
the liquid crystal panel includes a pair of substrates and a liquid crystal layer provided between the pair of substrates;
the liquid crystal layer includes a liquid crystal material which includes molecules having at least one of a carbon-carbon triple bond and a polycyclic group; and
the illuminator includes a light source causing primary generation of at least blue light, among other light which is used for displaying.

2. The liquid crystal display device of claim 1, wherein a coefficient of rotational viscosity $\gamma_1$ of the liquid crystal material at approximately 20° C. is about 120 mPa·s or less.

3. The liquid crystal display device of claim 1, wherein the molecules included in the liquid crystal material have a chemical structure expressed by one of the following formulae:

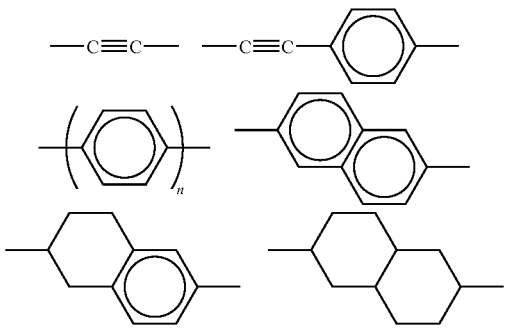

(where n in the formulae is an integer equal to or greater than 2; and any hydrogen atom contained in a ring structure in the formulae may be, independently, substituted by a halogen atom, a cyano group, or an isocyano group).

4. The liquid crystal display device of claim 3, wherein the liquid crystal material contains about 25 weight % or more of the molecules having the chemical structure.

5. The liquid crystal display device of claim 1, wherein a spectrum of blue light which is emitted by the light source has a peak wavelength at about 380 nm or more.

6. The liquid crystal display device of claim 1, wherein the light source generates substantially no light in an ultraviolet region.

7. The liquid crystal display device of claim 1, wherein the light source is a light-emitting diode.

8. The liquid crystal display device of claim 1, wherein the light source is an electroluminescence element.

9. The liquid crystal display device of claim 1, wherein the light source is a discharge tube.

10. The liquid crystal display device of claim 1, wherein the liquid crystal panel performs displaying in a vertical alignment mode.

11. The liquid crystal display device of claim 1, wherein the liquid crystal panel performs displaying in an in-plane switching mode.

12. The liquid crystal display device of claim 1, wherein the liquid crystal panel further includes a plurality of pixel regions arranged to modulate light emitted from the illuminator, and a switching element provided in each of the plurality of pixel regions.

13. The electronic apparatus comprising the liquid crystal display device of claim 1.

14. The electronic apparatus of claim 13, further comprising circuitry arranged to receive a television broadcast.

* * * * *